United States Patent
Liu et al.

(10) Patent No.: US 12,363,404 B2
(45) Date of Patent: Jul. 15, 2025

(54) CAMERA MODULE, MANUFACTURING METHOD AND MOBILE TERMINAL

(71) Applicant: NINGBO SUNNY OPOTECH CO., LTD., Zhejiang (CN)

(72) Inventors: Jia Liu, Zhejiang (CN); Dongli Yuan, Zhejiang (CN); Hangang Wei, Zhejiang (CN); Yanning He, Zhejiang (CN)

(73) Assignee: NINGBO SUNNY OPOTECH CO., LTD., Zhejiang (CN)

( * ) Notice: Subject to any disclaimer, the term of this patent is extended or adjusted under 35 U.S.C. 154(b) by 81 days.

(21) Appl. No.: 18/270,779

(22) PCT Filed: Dec. 17, 2021

(86) PCT No.: PCT/CN2021/139086
§ 371 (c)(1),
(2) Date: Jul. 3, 2023

(87) PCT Pub. No.: WO2022/143218
PCT Pub. Date: Jul. 7, 2022

(65) Prior Publication Data
US 2024/0056658 A1    Feb. 15, 2024

(30) Foreign Application Priority Data
Jan. 4, 2021    (CN) .......................... 202110003170.5

(51) Int. Cl.
*H04N 23/51*    (2023.01)
*H04N 23/16*    (2023.01)
(Continued)

(52) U.S. Cl.
CPC ............ *H04N 23/51* (2023.01); *H04N 23/16* (2023.01); *H04N 23/52* (2023.01); *H04N 23/54* (2023.01); *H04N 23/67* (2023.01); *H04N 23/681* (2023.01)

(58) Field of Classification Search
CPC ........ H04N 23/51; H04N 23/16; H04N 23/52; H04N 23/54; H04N 23/67; H04N 23/681; H04N 23/55; H04N 23/57
See application file for complete search history.

(56) References Cited

U.S. PATENT DOCUMENTS 9,568,705 B2 *    2/2017    Sekimoto ............. G02B 27/646
10,048,462 B2 *    8/2018    Mitsuyasu ................ G06T 7/73
(Continued)

FOREIGN PATENT DOCUMENTS

CN    105573014    5/2016
CN    110398872    11/2019
(Continued)

OTHER PUBLICATIONS

International Search Report issued Mar. 4, 2022 in International (PCT) Application No. PCT/CN2021/139086.

*Primary Examiner* — Padma Haliyur
(74) *Attorney, Agent, or Firm* — Wenderoth, Lind & Ponack, L.L.P.

(57) ABSTRACT

Provided in the present application are a camera module and a manufacturing method therefor. The camera module includes: a photosensitive assembly including a circuit board; a first lens structure, which is provided on a photosensitive path of the photosensitive assembly; a second lens structure, which is provided between the first lens structure and the photosensitive assembly, wherein the first lens structure and the second lens structure are jointly used for imaging, and the first lens structure is provided farther away from the photosensitive assembly than the second lens structure; a focusing assembly, which is electrically connected to the circuit board, and which is used to constrain the movement of the second lens structure along the optical axis direction of the first lens structure; and an anti-shake assembly, which is electrically connected to the circuit board, and which is used to drive the photosensitive assembly to move on a plane perpendicular to the optical axis of the first lens structure.

18 Claims, 7 Drawing Sheets

(51) Int. Cl.
*H04N 23/52* (2023.01)
*H04N 23/54* (2023.01)
*H04N 23/67* (2023.01)
*H04N 23/68* (2023.01)

(56) References Cited

U.S. PATENT DOCUMENTS

| | | | | |
|---|---|---|---|---|
| 2009/0041451 | A1* | 2/2009 | Miyamoto | G03B 9/14 |
| | | | | 396/493 |
| 2018/0136434 | A1* | 5/2018 | Alasirniö | G02B 7/023 |
| 2021/0195073 | A1* | 6/2021 | Saito | H04N 23/60 |
| 2021/0239933 | A1* | 8/2021 | Tseng | H04N 23/54 |
| 2021/0337125 | A1* | 10/2021 | Itaya | H04N 23/6812 |
| 2022/0091398 | A1* | 3/2022 | Smyth | H04N 23/687 |
| 2024/0251167 | A1* | 7/2024 | Li | H04N 23/687 |

FOREIGN PATENT DOCUMENTS

| | | | | |
|---|---|---|---|---|
| CN | 110737077 | | 1/2020 | |
| CN | 110740235 | | 1/2020 | |
| CN | 210781015 | | 6/2020 | |
| CN | 111474680 | | 7/2020 | |
| CN | 111641760 | | 9/2020 | |
| CN | 112153285 | | 12/2020 | |
| EP | 3779550 | | 2/2021 | |
| KR | 1020180135392 | | 12/2018 | |
| WO | WO-2020034826 | A1 * | 2/2020 | G02B 13/001 |

* cited by examiner

CAMERA MODULE, MANUFACTURING METHOD AND MOBILE TERMINAL

FIELD OF THE INVENTION

The present application relates to the technical field of optical devices, and more particularly, to a camera module, a manufacturing method, and a mobile terminal.

BACKGROUND OF THE INVENTION

In recent years, mobile terminals, such as mobile phones, are gradually developing towards the direction of thinness and high performance. The thinning and lightness of mobile phones will help improve the user's handheld experience. Therefore, mobile phone manufacturers also put forward corresponding requirements for the camera module, which is one of the standard configurations of mobile phones.

In order to meet users' requirements for imaging quality, camera modules usually need to have multiple functions such as high pixels, long focal length, large aperture, auto focus, and anti-shake. The integration of these functions often leads to an increase in the size of the camera module, especially to an increase of the height of the camera module.

The increased height of the camera module and the thinning of the mobile phone will cause the assembled camera module to protrude from the rear casing of the mobile phone and form a protrusion on the backside of the mobile phone. This will make the mobile phone in a tilted and unstable state when placed on a desktop or other surface, affecting the user's operating experience. More importantly, the camera module protrudes from the back cover of the mobile phone, which will cause the camera module or the protective cover outside the camera module to have a great risk of damage. For example, bumping or falling can easily lead to scratches and cracks generation, thus affecting the imaging of the camera module.

SUMMARY OF THE INVENTION

The present application provides a camera module, a manufacturing method and a mobile terminal that can at least partially solve the above technical problems.

In one aspect of the present application, provided is a camera module, including: a photosensitive assembly including a circuit board; a first lens structure, provided on a photosensitive path of the photosensitive assembly; a second lens structure, provided between the first lens structure and the photosensitive assembly, wherein, the first lens structure and the second lens structure are jointly used for imaging together, and the first lens structure is provided away from the photosensitive assembly than the second lens structure; a focusing assembly, electrically connected to the circuit board, and used to limit the movement of the second lens structure along an optical axis direction of the first lens structure; and an anti-shake assembly, electrically connected to the circuit board, and used to drive the photosensitive assembly to move on a plane perpendicular to the optical axis of the first lens structure.

In one example, the electrical connection between the focusing assembly and the circuit board is realized through a laser circuit, and the electrical connection between the anti-shake assembly and the circuit board is realized through the laser circuit.

In one example, the focusing assembly includes: a driving part, fixedly connected with the second lens structure; and a fixing frame, fixedly connected with the first lens structure, and constraining the driving part to move along the direction of the optical axis of the first lens structure.

In one example, the driving part is provided with at least one first magnetic structure, and is provided with at least one first ball groove parallel to the optical axis of the first lens structure; and the fixing frame is provided with at least one first coil structure and at least one second ball groove, wherein a position of the first coil structure corresponds to a position of the first magnetic structure, and the position of the first ball groove corresponds to a position of the second ball groove; and the focusing assembly further includes a plurality of first balls located between the first ball groove and the second ball groove.

In one example, the anti-shake assembly includes: a movable part, fixedly connected with the photosensitive assembly; a fixing part, fixedly connected with the first lens structure, and used for driving the movable part to move on the plane perpendicular to the optical axis of the first lens structure.

In one example, the movable part is provided with at least one second magnetic structure, and is provided with a plurality of third ball grooves perpendicular to the optical axis of the first lens structure; the fixing part is provided with at least one second coil structure and at least one fourth ball groove, wherein a position of the second coil structure corresponds to a position of the second magnetic structure, and a position of the fourth ball groove corresponds to a position of the third ball groove; and the anti-shake assembly further include a plurality of second balls located between the third ball groove and the fourth ball groove.

In one example, the camera module further includes: an installation housing, for accommodating the first lens structure and the second lens structure; and the focusing assembly is fixedly connected to the first lens structure through the installation housing; and the anti-shake assembly is fixedly connected to the first lens structure through the installation housing.

In one example, the installation housing accommodates the photosensitive assembly, and the movable part is fixedly connected to a top surface of the photosensitive assembly, and an outer periphery of the fixing part is fixedly connected to an inner side of an upper edge of the installation housing.

In one example, the camera module further includes: a third lens structure, provided between the second lens structure and the photosensitive assembly, and fixedly connected to the first lens structure through the installation housing; and the focusing assembly includes an extension part located on an radial outer side of the third lens structure and extendes to the anti-shake assembly along the direction of the optical axis of the first lens structure, and the focusing assembly and the circuit board of the photosensitive assembly are electrically connected to the extension part.

In one example, at least one lens of the first lens structure includes: the first lens which is farthest from the photosensitive assembly; and an object side surface of the first lens is a plane.

In one example, the image side of the first lens is concave.

In one example, the circuit board has a first surface; and the photosensitive assembly includes: a photosensitive element, provided on the first surface of the circuit board and having the photosensitive path; an electronic component, provided on the first surface of the circuit board and provided spaced apart from the photosensitive element; a molding base, provided on the first surface of the circuit board, and having a stepped light-passing hole corresponding to the photosensitive path, wherein the stepped light-passing hole includes a first cavity away from the photosensitive element;

and a color filter, provided in the first cavity, wherein a thickness of the color filter on the optical axis of the first lens structure is less than or equal to a height of the first cavity on the optical axis of the first lens structure on axis.

In one example, the circuit board has an installation groove for accommodating the photosensitive element, wherein a shape of the installation groove corresponds to a shape of the photosensitive element.

In one example, a reinforcing plate is provided on a second surface of the circuit board opposite to the first surface, and the reinforcing plate is fixed to the second surface of the circuit board.

In one example, a depth of the installation groove is less than or equal to the thickness of the circuit board.

In one example, the electronic component is encapsulated by the molding base.

Another aspect of the present application provides a method for manufacturing a camera module, including: providing a second lens structure on an image side of a first lens structure along an optical axis of the first lens structure; providing a focusing assembly on the image side of the first lens structure along the optical axis of the first lens structure, wherein the focusing assembly is used to constrain the movement of the second lens structure along a direction of the optical axis of the first lens structure; providing a photosensitive assembly including a circuit board on an image side of the second lens structure, so that the second lens structure is located on a photosensitive path of the photosensitive assembly; providing an anti-shake assembly at the photosensitive assembly, wherein the anti-shake assembly is used to drive the photosensitive assembly to move on a plane perpendicular to the optical axis of the first lens structure; and electrically connecting the anti-shake assembly and the circuit board and electrically connecting the focusing assembly and the circuit board; wherein, the first lens structure is provided away from the photosensitive assembly than the second lens structure.

In one example, the method further includes: adjusting the first lens structure and the second lens structure by using machine vision and active alignment technology.

A third aspect of the present application provides a mobile terminal, including: the aforementioned camera module; and a body casing, provided with the camera module, and including a installation hole matched with the photosensitive path of the camera module.

In one example, in at least one lens of the first lens structure, the object side surface of the first lens farthest from the photosensitive element is on the same plane as an outer surface of the body casing.

The present application provides a camera module that realizes a focusing function inside an optical system and realizes an anti-shake function on the image side of the optical system. The overall height of the camera module is low, and it has the characteristics of being light and thin. Moreover, with the arrangement of the circuit wires, the coordinated use of the focusing assembly and the anti-shake assembly is realized, so that the camera module has a better anti-shake function.

BRIEF DESCRIPTION OF THE DRAWINGS

Other features, objects and advantages of the present application will become more apparent by reading the detailed description of non-limiting examples made with reference to the following drawings.

DETAIL DESCRIPTION OF THE INVENTION

For a better understanding of the present application, various aspects of the present application will be described in more detail with reference to the accompanying drawings. It should be understood that these detailed descriptions are merely illustrative of exemplary examples of the present application and are not intended to limit the scope of the present application in any way.

The terminology used herein is for the purpose of describing particular example examples and is not intended to be limiting. When used in this specification, the terms "comprise", "comprising", "includes" and/or "including" indicate the presence of stated features, integers, elements, parts and/or combinations thereof, but do not exclude the presence of one or more other features, integers, elements, components and/or combinations thereof.

This application is described with reference to schematic illustrations of exemplary examples. The exemplary examples disclosed herein should not be construed as limited to the specific shapes and dimensions shown, but to include various equivalent structures capable of achieving the same function, as well as deviations in shape and dimensions resulting, for example, in manufacture. The locations shown in the figures are schematic in nature and are not intended to limit the location of the various components.

Unless otherwise defined, all terms (including technical and scientific terms) used herein have the same meaning as commonly understood by those ordinary skilled in the art to which this disclosure belongs. Terms such as those defined in commonly used dictionaries should be construed to have meanings consistent with their meanings in the context of the relevant art, and are not to be construed in an idealized or overly formal sense unless explicitly so defined herein.

Figure 1:
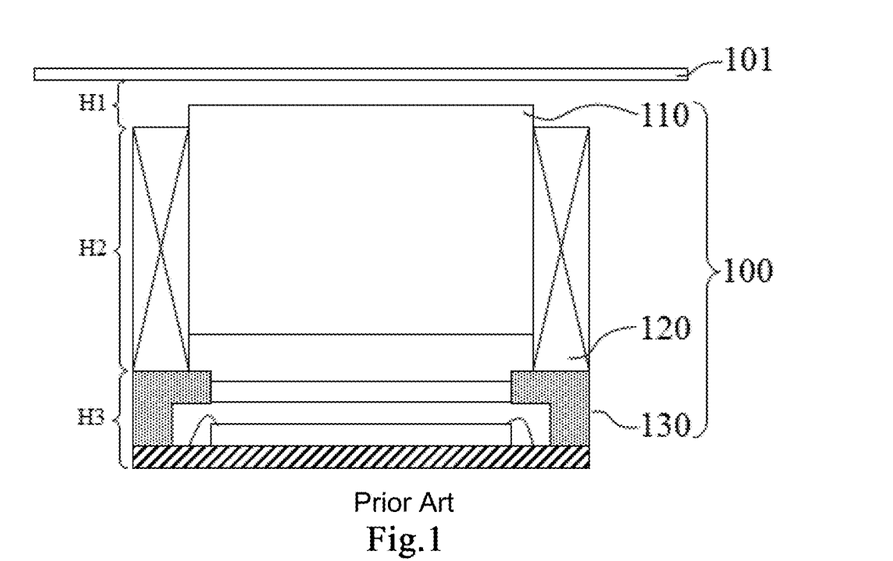
FIG. 1 is the assembly structure schematic diagram of a conventional camera module.

FIG. 1 is a schematic diagram of an assembly structure of a conventional camera module 100. As shown in FIG. 1, the conventional camera module 100 includes a lens assembly 110, a driving motor 120 and a photosensitive assembly 130.

The driving motor 120 has a driving unit and a fixing unit (not shown). The driving unit is fixedly connected with the lens assembly 110. By moving the driving unit in different directions relative to the fixing unit, the lens assembly 110 fixedly connected with the driving unit can be made to generate relative movement, thereby realizing the focusing and anti-shake functions of the camera module 100.

Generally, when the camera module 100 is installed on a mobile terminal such as a mobile phone, a glass cover plate 101 needs to be provided above the lens assembly 110 away from the photosensitive assembly 130 to protect the internal structure of the camera module 100. And a movable space for the lens assembly 110 needs to be reserved between the lens assembly 110 and the glass cover plate 101. That is to say, there is a movable space for the lens assembly 110 with a height H1 between the lens assembly 110 and the glass cover plate, so as to realize the focusing function of the camera module. Therefore, the installation height of the camera module 100 installed in the mobile phone can be composed of the height H1 of the movable space, the height H2 of the driving motor 120 and the height H3 of the photosensitive element 130.

When the conventional camera module 100 is installed on a mobile phone, due to the thickness limitation of the mobile phone, the camera module 100 will protrude out of the body casing of the mobile phone after being installed, such as the rear casing, thereby affecting the performance of the mobile phone.

The camera module of the examples of the present application will be described in detail below with reference to the accompanying drawings.

Figure 2:
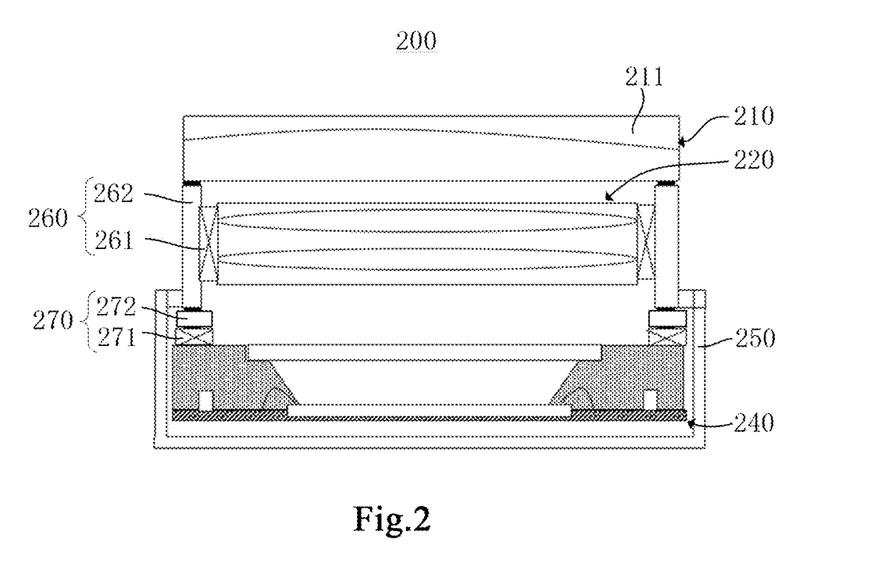
FIG. 2 is a schematic cross-sectional view of a camera module according to an example of the present application.

FIG. 2 is a schematic cross-sectional structure diagram of a camera module 200 according to an example of the present application. As shown in FIG. 2, the camera module 200 includes: a first lens structure 210, a second lens structure 220, a photosensitive assembly 240, a focusing assembly 260 and an anti-shake assembly 270.

The lenses in the first lens structure 210 and the lenses in the second lens structure 220 can jointly form the optical system of the camera module 200 and can be maintained on the photosensitive path of the photosensitive assembly 240. The imaging plane of the optical system may be located at the photosensitive assembly 240. The optical system includes at least two lens structures provided along the optical axis of the optical system from the object side to the image side, wherein the first lens structure 210 is located at the most object side along an optical axis direction.

The imaging light incident from the object side passes through the first lens structure 210 and the second lens structure 220 in sequence, and is then received by the photosensitive assembly 240 and photoelectrically converted to form an image of the object. Specifically, for the optical system, the side of the object being photographed may be referred to as the object side, and the photosensitive assembly 240 side may be referred to as the image side. In this example, after the first lens structure 210 and the second lens structure 220 cooperate, they are jointly used to adjust the light and transmit the light to the photosensitive assembly 240 for imaging.

The focusing assembly 260 includes a driving part 261 and a fixing frame 262, the driving part 261 is fixedly connected with the second lens structure 220, the fixing frame 262 can be fixedly connected with the first lens structure 210, and constrains the driving part 261 to move along the optical axis direction, the driving part 261 can cause the second lens structure 220 and the first lens structure 210 to be displaced relative to each other in the optical axis direction, so as to realize the focusing function of the camera module 200.

The anti-shake assembly 270 can adjust the displacement of the photosensitive assembly 240 according to the shaking of the camera module 200, thereby compensating for the shaking of the camera module 200. The anti-shake assembly 270 includes a movable part 271 and a fixing part 272. The movable part 271 may be fixedly connected with the photosensitive assembly 240 by means of, for example, bonding.

The fixing part 272 can be fixedly connected with the first lens structure 210 through the fixing frame 262. Exemplarily, the fixing part 272, the fixing frame 262 and the first lens structure 210 may be fixedly connected through the installation housing 250. Generally, when the installation housing 250 is installed on a mobile terminal such as a mobile phone, the fixing part 272 fixedly connected with the installation housing 250 can be kept in a stationary state. And the fixing part 272 can drive the movable part 271 to move on a plane perpendicular to the optical axis.

Specifically, when the fixing part 272 is fixed, the movable part 271 is movable relative to the fixing part 272 on a plane perpendicular to the optical axis. Specifically, the movable part 271 can be used to move a minute distance. Since the fixing part 272 is fixedly connected to the first lens structure 210 and remains fixed, the movable part 271 can drive the photosensitive assembly 240 to move slightly along the direction perpendicular to the optical axis, thereby realizing the anti-shake function of the camera module 200.

Both of the focusing assembly 260 and the anti-shake assembly 270 are electrically connected to the circuit board of the photosensitive assembly 240. Compared with the traditional way of electrically connecting the drive motor with the external circuit using circuit wires, the built-in focusing assembly 260 and the anti-shake assembly 270 are electrically connected to the circuit board of the photosensitive assembly 240, which can further miniaturize the camera module, and it is convenient to realize the electrical connection of two assemblies at the same time.

Exemplarily, in order to cooperate with the focusing assembly 260 and the anti-shake assembly 270 and further miniaturize the camera module 200, the lens in the second lens structure may be trimmed based on the Lens Dcut technology to remove the lens part outside the photosensitive path of the photosensitive assembly 240.

The examples of the present application provide a camera module 200 that implements a focusing function inside an optical system and realizes an anti-shake function on the image side of the optical system. The camera module 200 does not need to be provided with a movable space that needs to be reserved when the conventional drive motor structure is used, but instead utilizes the second lens structure 220 located between the first lens structure 210 and the photosensitive assembly 240. The second lens structure 220 moves in a certain space on the object side and the image side to realize the focusing of the camera module 200, which is beneficial to reduce the overall height of the camera module 200 and facilitate the lightness and thinness of the camera module 200. Moreover, through the arrangement of the circuit wires, the cooperating use of the focusing assembly 260 and the anti-shake assembly 270 is realized, so that the camera module 200 has a better anti-shake function. Also, by moving the photosensitive assembly 240 as a whole on a plane perpendicular to the optical axis, the circuit board 241 and the photosensitive element 242 of the photosensitive assembly 240 can be moved synchronously, so as to effectively protect the wire connection between them, and ensure current supply under working condition.

Figure 3:
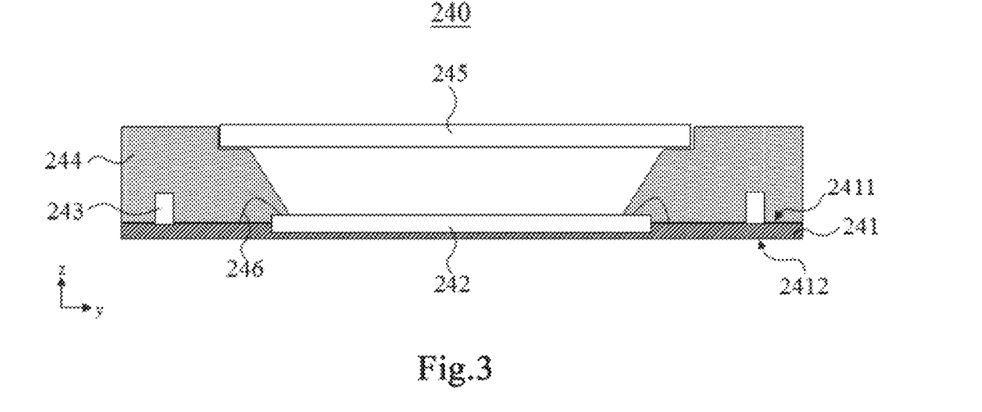
FIG. 3 is a schematic cross-sectional view of a photosensitive assembly according to an example of the present application.

FIG. 3 is a schematic cross-sectional structure diagram of a photosensitive assembly 240 according to an example of the present application. As shown in FIG. 3, the photosensitive assembly 240 includes a circuit board 241, a photosensitive element 242, an electronic component 243, a molding base 244 and a color filter 245.

The circuit board 241 can be used as a substrate of the photosensitive assembly 240 for supporting other parts of the photosensitive assembly 240. The circuit board 241 may have a first surface 2411 and a second surface 2412 opposite to the first surface 2411.

The photosensitive element 242 may be provided on the first surface 2411 of the circuit board 241. Specifically, the photosensitive element 242 may be mounted on the central area of the first surface 2411 of the circuit board 241. The photosensitive element 242 and the circuit board 241 may be electrically connected to an edge area surrounding the central area of the circuit board 241 through connecting wires 246.

Exemplarily, the photosensitive element 242 may be a photocoupler element (CCD) or a complementary metal oxide semiconductor element (COMS). And the photosensitive element 242 includes a photosensitive area at the center and a non-photosensitive area around the photosensitive area. The photosensitive area of the photosensitive element 242 can receive light through the optical system including the first lens structure 210 and the second lens structure 220, and has a photosensitive path corresponding to the photosensitive area.

Exemplarily, the connecting wires 246 may be gold wires. After the photosensitive element 240 is mounted on the circuit board 241, one end of the gold wire is connected to the photosensitive element 242 and the other end of the gold wire is connected to the circuit board 241 through a gold wire bonding process. It should be understood by those skilled in the art that the connecting wire 246 may also be of other types, such as silver wire, copper wire, and the like.

In one example, the circuit board 241 has an installation groove for accommodating the photosensitive element 242, and the shape of the installation groove corresponds to the shape of the photosensitive element 242. Exemplarily, the depth of the installation groove may be equal to the thickness of the circuit board 241. When the thickness of the photosensitive element 242 is less than or equal to the thickness of the circuit board 241, the photosensitive element 242 can be completely embedded in the installation groove of the circuit board 241, and a reinforcing plate, such as a steel plate, can also be provided on the second surface 2412 of the circuit board 241, for enhancing the strength of the circuit board 241.

As an option, the depth of the installation groove may be smaller than the thickness of the circuit board 241, and when the photosensitive element 242 is embedded in the installation groove, the photosensitive element 242 may protrude from the first surface 2411 of the circuit board 241 (as shown in FIG. 3). Similarly, a reinforcing plate, such as a steel plate, can also be provided on the second surface 2412 of the circuit board 241 to enhance the strength of the circuit board 241.

The volume and weight of the photosensitive assembly 240 can be reduced as a whole by providing the installation groove on the circuit board 241 to match the photosensitive element 242, which is beneficial to the anti-shake control accuracy of the photosensitive assembly 240, and the specific structure and working principle of the anti-shake assembly 270 will be hereinafter described in detail.

The electronic components 243 is provided on the first surface 2411 of the circuit board 241 and is spaced apart from the photosensitive elements 242. Specifically, the electronic component 243 can be mounted on the edge region of the first surface 2411 of the circuit board 241 and is spaced apart from the photosensitive element 242 by a certain distance. The electronic components 243 may be implemented, for example, as capacitors, resistors, drive devices, or the like.

The molding base 244 can be provided on the first surface 2411 of the circuit board 241 and has a stepped light-passing hole corresponding to the photosensitive path of the photosensitive element 242. The stepped light-passing hole has at least two cavities with different diameters, and the cavity farthest from the photosensitive element 242 is the first cavity.

In one example, the molding base 244 has a top surface parallel to the first surface 2411 of the circuit board 241, and the cavity of the stepped light-passing hole close to the photosensitive element 242 has an inclined inner surface. Exemplarily, the molding base 244 is provided on the edge region of the first surface 2411 of the circuit board 241 and not overlap with the photosensitive element 242. As an option, the molding base 244 is provided on the edge area of the first surface 2411 of the circuit board 241 and overlap with the non-photosensitive area of the photosensitive element 242 (as shown in FIG. 3).

The molding base 244 is used for molding the gold wire of the circuit board 241 in its interior, which can replace a conventional color filter holder at the same time of protecting the gold wire. Setting the molding base 244 can not only reduce the weight of the camera module, but also reduce the height of the camera module.

In one example, the molding base 244 covers the electronic components 243 and the connecting wires 246 and is integrally formed with the circuit board 241 through a molding process. In other words, the electronic component 243 can be encapsulated inside the molding base 244. Exemplarily, the whole formed by the molding base 244 and the circuit board 241 further include a non-photosensitive area of the photosensitive element 242. The electronic component 243 is encapsulated between the molding base 244 and the circuit board 241, which can effectively protect the electronic component 243.

The color filter 245 can be provided in the first cavity of the stepped light-passing hole, and the thickness of the color filter 245 on the optical axis is less than or equal to the height of the first cavity of the stepped light-passing hole on the optical axis, and the a space is formed between the color filter 245 and the photosensitive element 242. When the thickness of the color filter 245 is less than or equal to the height of the first cavity of the stepped light-passing hole on the optical axis, the color filter 245 and the top surface of the molding base 244 can be in the same plane, or the color filter 245 is concave relative to the top surface of the molding base 244. This helps to reduce the overall height of the photosensitive assembly 240, thereby reducing the overall height of the camera module. In addition, the use of the molding base 244 to support the color filter 245 can eliminate the independently provided color filter installation base, which can reduce the volume and weight of the photosensitive assembly 240 as a whole, which is beneficial to the anti-shake control accuracy of the photosensitive assembly 240, and the specific structure and working principle of the anti-shake assembly 270 will be described in detail below.

Exemplarily, the color filter 245 may be implemented as an infrared cut filter, a fully transparent spectral filter, and other color filters or combinations of multiple color filters.

In the exemplary example, the electrical connection between the focusing assembly 260 and the circuit board 241 is realized through a laser circuit, and the electrical connection between the anti-shake assembly 270 and the circuit board 241 is realized.

Laser circuit is a circuit formed by laser. Specifically, according to the mechanism of the interaction between the laser beam and the material, the laser circuit of the present application can be formed by photochemical reaction, including methods such as photochemical deposition, stereolithography, laser engraving and etching. For example, a laser beam is used to irradiate the substrate of the focusing assembly 260, and based on the chemical agent provided on the substrate, a circuit is formed by activating, initiating or controlling a photochemical reaction by means of high-energy photons. The shape and configuration of the laser circuit can be attached to the substrate and can be freely designed and manufactured, and can be better suited for the zoom assembly 260 and the anti-shake assembly 270 that need to be moved.

The circuit board 241 of the photosensitive assembly 240 can be connected to the outside by using a structure such as a flexible board, and then a connector can be used to supply the same power to the zoom component 260 and the anti-shake assembly 270. While ensuring the anti-shake performance, the volume of the camera module 200 is further reduced, and the installation space inside the device (e.g., mobile phone) for setting the camera module 200 provided by the present application is saved.

Figure 4:
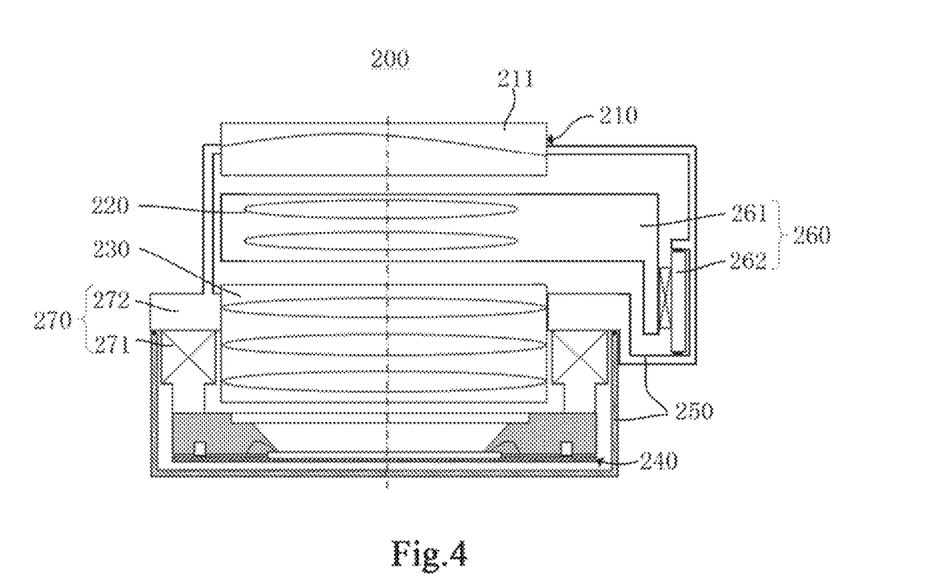
FIG. 4 is a schematic cross-sectional view of another camera module according to an example of the present application.

Referring to FIGS. 2 and 4, in an exemplary example, the plurality of lens structures used to form the optical system further includes: a third lens structure 230 provided on the image side of the second lens structure 220 along the optical axis, and fixedly connected with the first lens structure 210.

In an exemplary example, the first lens structure 210 includes a first lens 211. When the first lens structure 210 includes a plurality of lenses, the first lens 211 is the lens located on the most object side, that is, the lens farthest from the photosensitive assembly 240.

The lenses in the first lens structure 210 may be made of plastic or optical glass. Exemplarily, the first lens structure 210 includes a first lens barrel, and the lenses in the first lens structure 210 are connected to the first lens barrel by, for example, bonding, so as to carry and protect the lenses in the first lens structure 210.

In one example, in at least one lens of the first lens structure 210, the object side of the first lens 211 farthest from the photosensitive assembly 240 may be a plane, so that the first lens 211 can be fully fit with an external element such as a glass cover plate during contact installation, which is beneficial to reduce the overall installation height of the camera module 200.

Exemplarily, the first lens structure 210 includes a plano-concave lens, and the object side of the plano-concave lens may be flat, and the image side may be concave. It should be understood that the first lens structure 210 may also be a single lens or a combination of multiple lenses in other forms. As long as the object side of the first lens 211 farthest from the photosensitive assembly 240 is flat and meets the requirements for optical imaging, a flat mounting plane can be provided for the external elements.

Likewise, the second lens structure 220 includes at least one lens, for example, two lenses, and the lenses in the second lens structure 220 may be made of optical plastic cement or optical glass. Exemplarily, the second lens structure 220 includes a second lens barrel, and the lenses in the second lens structure 220 are connected to the second lens barrel by, for example, bonding, so as to carry and protect the lenses in the second lens structure 220.

The third lens structure 230 includes at least one lens, e.g., three lenses, and the lenses in the third lens structure 230 may be made of plastic or optical glass. Exemplarily, the third lens structure 230 includes a third lens barrel, and the lenses in the third lens structure 230 are connected with the third lens barrel by, for example, bonding, so as to carry and protect the lenses in the third lens structure 230.

The lenses of the first lens structure 210, the second lens structure 220, and the third lens structure 230 together constitute an optical imaging system of the camera module 200. Exemplarily, the first lens structure 210, the second lens structure 220 and the third lens structure 230 can be formed into a whole of which optical axes are located on the same straight line by, for example, bonding, so as to receive external image information and transmit the image information to the photosensitive assembly 240.

Referring to FIG. 4, for example, the camera module 200 further includes: a installation housing 250 for accommodating the first lens structure 210 and the second lens structure 220. Exemplarily, the installation housing 250 may only accommodate a portion of the first lens structure 210 that is biased toward the image side. The focusing assembly 260 is fixedly connected to the first lens structure 210 through the installation casing 250; the anti-shake assembly 270 is fixedly connected to the first lens structure 210 through the installation casing 250.

Further, the installation housing 250 can accommodate the first lens structure 210, the second lens structure 220 and the third lens structure 230, and the installation housing 250 can be fixed with the first lens structure 210 and the third lens structure 230 by, for example, bonding (not shown). When the installation housing 250 is installed on a mobile terminal such as a mobile phone, the first lens structure 210 and the third lens structure 230 fixedly connected with the installation housing 250 can remain in static in a working state.

At least one lens in the first lens structure 210, at least one lens in the second lens structure 220, and at least one lens in the third lens structure 230 may collectively form an optical system of the camera module 200. The light incident on the object side passes through the first lens structure 210, the second lens structure 220 and the third lens structure 230 in sequence, and is then received by the photosensitive assembly 240 and converted into photoelectricity.

Referring to FIG. 2 and FIG. 4, the focusing assembly 260 may be designed in different styles according to the specific structure of the camera module 200, and may includes a driving part 261 and a fixing frame 262. The driving part 261 can be fixedly connected to the second lens structure 220 by means of, for example, bonding, threading and snapping. Specifically, the driving part 261 can be fixedly connected to the second lens barrel of the second lens structure 220.

The fixing frame 262 can be fixedly connected with the installation housing 250. Generally, when the installation housing 250 is installed on a mobile terminal such as a mobile phone, the fixing frame 262 fixedly connected with the installation housing 250 can remain in a stationary state. In addition, the fixing frame 262 may constrain the driving part 261 to move in the direction of the optical axis.

Specifically, when the fixing frame 262 is fixed, the driving part 261 can move a slight distance along the optical axis of the second lens structure 220 relative to the fixing frame 262. Since the optical axis of the first lens structure 210, the optical axis of the second lens structure 220 and the optical axis of the third lens structure 230 are coaxial, and since the first lens structure 210 (and the third lens structure 230) are fixedly connected the fixing frame 262 so as to remain fixed, the driving part 261 can drive the second lens structure 220 to move slightly relative to the first lens structure 210 along the optical axis, so as to realize the fine adjustment of the position of the second lens structure 220, so that the first lens structure 210 in a fixed state, and the camera module 200 realizes the focusing function inside, thereby effectively improving the quality of the generated image.

It should be understood that when the fixing frame 262 of the focusing assembly 260 is fixedly connected to the third lens structure 230, due to the constrained movement of the driving part 261 by the fixing frame 262, the second lens structure 220 fixedly connected to the driving part 261 can also generate the relative displacement along the optical axis with the third lens structure 230, so as to realize the focusing function of the camera module 200.

Figure 5:
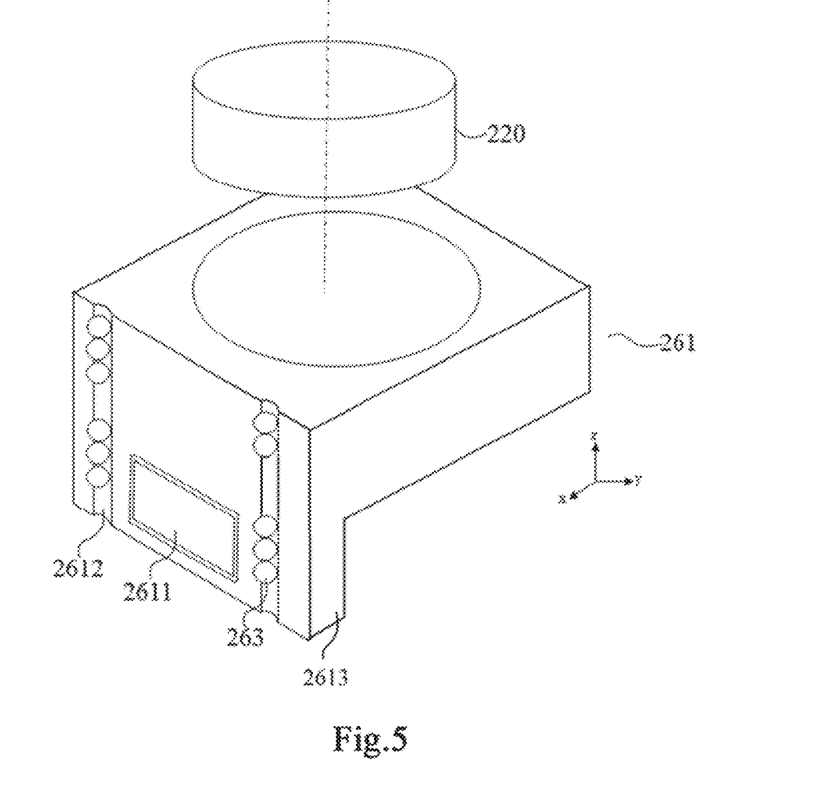
FIG. 5 is a schematic structural diagram of a fixing frame according to an example of the present application.
Figure 6:
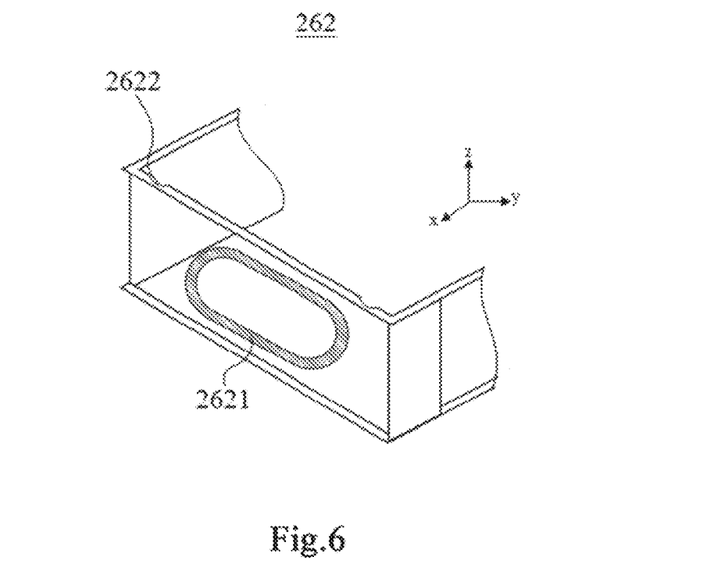
FIG. 6 is a schematic structural diagram of a driving part according to an example of the present application.

Referring to FIGS. 4 and 5, exemplarily, the focusing assembly 260 includes an extension part 2613 located radially outside the third lens structure 230 and extending to the anti-shake assembly 270 in the direction of the optical axis, and the focusing assembly is electrically connected to the circuit board 241 at the extension part 2613.

Referring specifically to FIG. 5, the driving part 261 may be a rectangular parallelepiped having a central through structure, which can accommodate the second lens structure 220 and is fixedly connected to the second lens structure 220. Optionally, a first magnetic structure 2611 is provided on the extension part 2613 thereof. On the side surface of the extension part 2613, two first ball grooves 2612 are symmetrically provided on both sides of the first magnetic structure 2611, and the first ball grooves 2612 are spaced apart from the first magnetic structure 2611. In addition, the extending direction of the first ball groove 2612 is parallel to the optical axis direction of the second lens structure 220. In other words, the extending direction of the first ball groove 2612 is parallel to the optical axis direction.

The fixing frame 262 can be used for accommodating the driving part 261, and a first coil structure 2621 and a second ball groove 2622 are provided at positions corresponding to the extending part 2613 of the driving part 261.

A plurality of first balls 263 may be provided in the space formed between the first ball groove 2612 and the second ball groove 2622, and the size of the first ball 263 may be matched with the size of the first ball groove 2612 and the second ball groove 2622. Specifically, the first ball groove 2612 and the second ball groove 2622 are formed with at least a pair of substantially parallel planes, and the diameter of the first ball 263 is equivalent to the distance between the at least one pair of planes. Under the support of the first balls 263, when the driving part 261 is stressed, the first ball grooves 2612 are displaced in parallel with respect to the second ball grooves 2622 along the optical axis direction. Further, the diameter of the first balls 263 is equivalent to the distance between a pair of planes, and the focusing assembly 260 further includes a holder, which is used to keep the plurality of first balls 263 in relative positions.

When the first coil structure 2621 is applied current, according to the principle of electromagnetic induction, due to the magnetic force between the first coil structure 2621 and the first magnetic structure 2611, the first magnetic structure 2611 and the first coil structure 2621 generate a relative force. Specifically, when the electromagnetic force induced by the current applied by the first coil structure 2621 acts on the first magnetic structure 2611, the fixing frame 262 provided with the first coil structure 2621 is fixed. Therefore, the driving part 261 provided with the first magnetic structure 2611 generate movement along the optical axis direction along the first ball groove 2612 and the second ball groove 2622 and the plurality of first balls 263 matched therewith. Therefore, the second lens structure 220 fixedly connected with the driving part 261 generate movement along the optical axis direction, and since the first lens structure 210 and the third lens structure 230 are fixed, the second lens structure 220 produces changes in relative position along the optical axis direction relative to the first lens structure 210 and the third lens structure 230, and the focusing of the camera module 200 can be achieved by adjusting the relative positions of the respective lens structures.

Through the cooperation of the coil and the magnetic structure and the cooperation of the ball and the ball groove, the internal focusing function of the camera module 200 can be realized, which is simple in principle, easy to realize, and beneficial for cost savings. In addition, the balls and ball grooves cooperate to reduce friction and help improve the sensitivity when focusing.

It should be understood by those skilled in the art that the specific structural form and realization manner of the driving part and the fixing frame are not limited to this, and other forms can also be used to cause the driving part and the fixing frame to move relative to each other in a constrained direction. The present application enables an optical system composed of a plurality of lens structures to realize the internal focusing function, which is beneficial to reduce the overall installation height of the camera module, and is beneficial to the lightness and thinness of the camera module.

Figure 7:
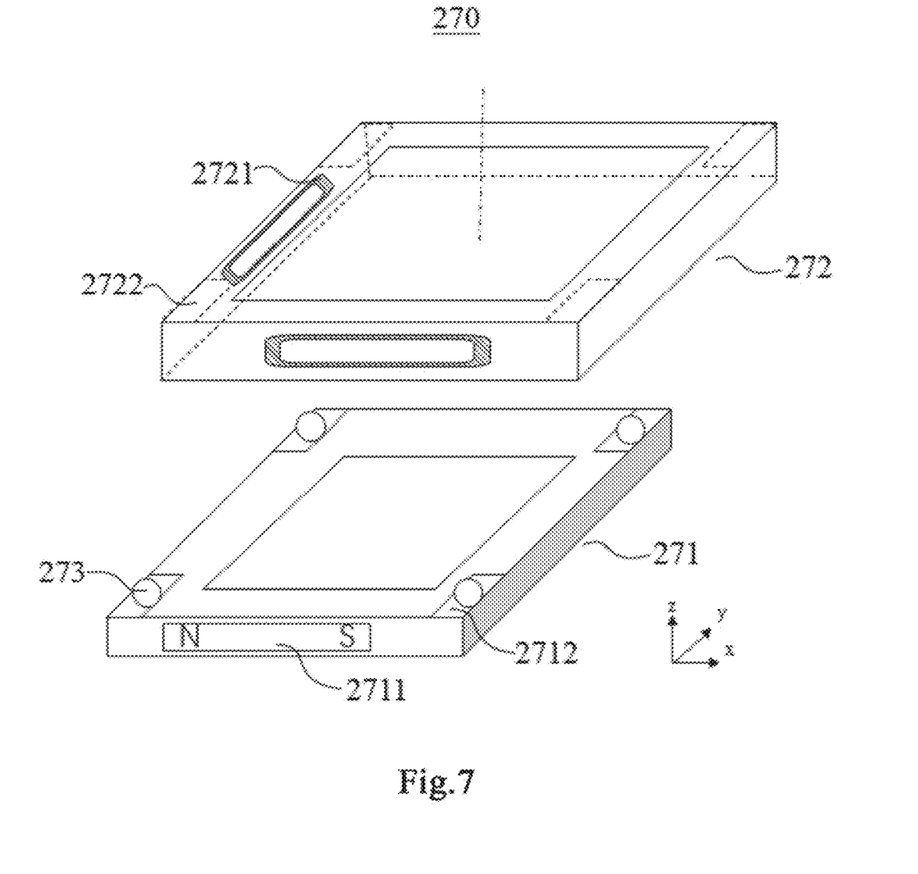
FIG. 7 is a schematic structural diagram of an anti-shake assembly according to an example of the present application.
Figure 8:
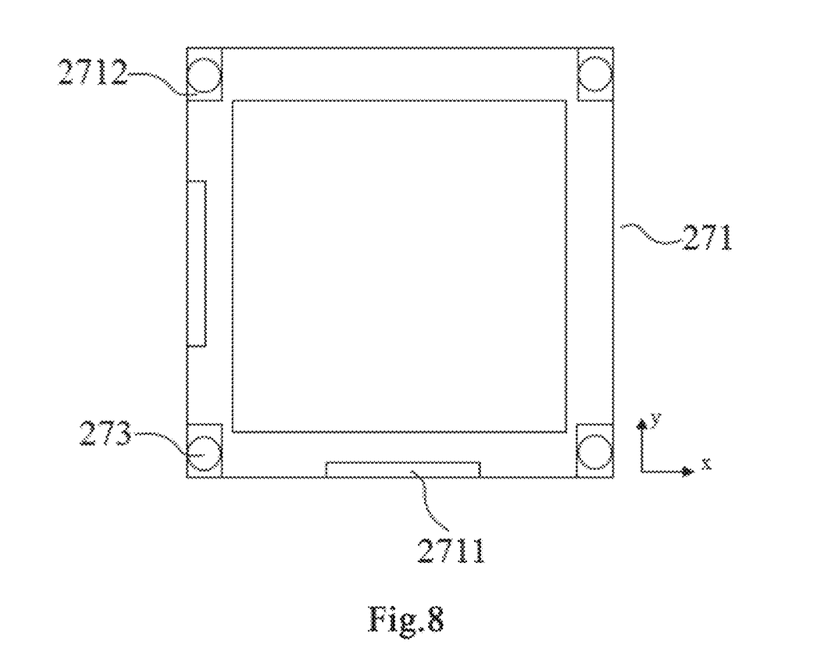
FIG. 8 is an assembled plan view of a movable part according to an example of the present application.

FIG. 7 is a schematic structural diagram of an anti-shake assembly 270 according to an example of the present application. FIG. 8 is an assembly plan view of the movable part 271 according to the example of the present application. As shown in FIG. 7 and FIG. 8, in one example, the movable part 271 may be a rectangular parallelepiped having a central through structure, and the central through structure may correspond to the photosensitive path of the photosensitive assembly 240 and be fixedly connected to the photosensitive assembly 240, for example, the bottom surface of the movable part 271 can be fixedly connected with the top surface of the molding base 244 of the photosensitive assembly 240. Second magnetic structures 2711 may be provided on two adjacent side surfaces of the movable part 271, and third ball grooves 2712 may be provided in four corner areas of the top surface of the movable part 271. When the movable part 271 is provided perpendicular to the optical axis, the plane at which the third ball groove 2712 is located may be perpendicular to the optical axis.

The fixing part 272 can be used for accommodating the movable part 271, and at the positions of the fixing part 272 corresponding to the second magnetic structure 2711 and the third ball groove 2712, a second coil structure 2721 and a fourth ball groove 2722 are respectively provided.

A plurality of second balls 273 may be provided in spaces formed between the third ball grooves 2712 and the fourth ball grooves 2722, and the sizes of the second balls 273 may be matched with the third ball grooves 2712 and the fourth ball grooves 2722.

When the second coil structure 2721 is applied current, according to the principle of electromagnetic induction, the second magnetic structure 2711 moves relative to the second coil structure 2721 due to the magnetic force between the second coil structure 2721 and the second magnetic structure 2711. Specifically, when the electromagnetic force induced by the current applied by the second coil structure 2721 in the direction parallel to the x-axis attracts or repels the second magnetic structure 2711, the fixing part 272 provided with the second coil structure 2721 is fixed, and thus the movable part 271 provided with the second magnetic structure 2711 can drive the photosensitive element 240 to move along the y-axis direction. When the electromagnetic force induced by the current applied by the second coil structure 2721 parallel to the y-direction attracts or repels the second magnetic structure 2711, the fixing part 272 provided with the second coil structure 2721 is fixed. Therefore, the movable part 272 provided with the second magnetic structure 2722 can drive the photosensitive element 240 to move along the x-axis direction. In this way, the movable part 272 can drive the photosensitive assembly 240 to move relatively on the xy plane. When the optical axis is in the z-axis direction, the anti-shake assembly 270 can make the photosensitive assembly 240 move in a direction perpendicular to the optical axis.

It should be understood by those skilled in the art that the specific structural forms and realization manners of the movable part and the fixing part are not limited thereto, and other forms may also be used to cause the movable part and the fixing part to move relative to each other. For example, piezoelectric ceramics can be used for anti-shake assemblys and zoom assemblys. The present application realizes the anti-shake effect of the camera module by adjusting the relative position of the photosensitive assembly by using the anti-shake assembly, which can avoid the degradation of the imaging quality by adjusting multiple sets of lenses, and is beneficial to improve the imaging quality of the camera module.

Figure 9:
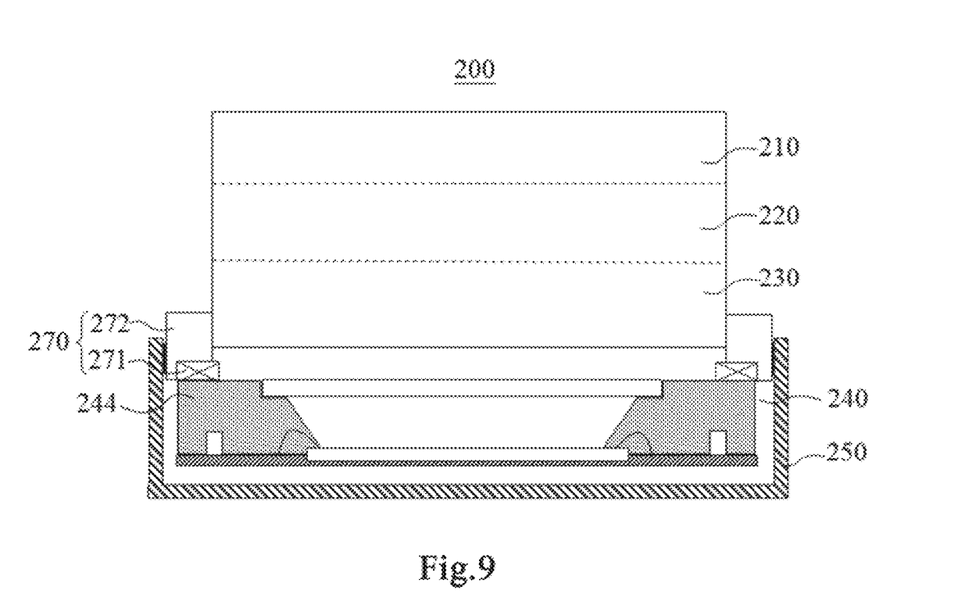
FIG. 9 is an assembly schematic diagram of another camera module according to an example of the present application.

FIG. 9 is an assembly schematic diagram of the camera module 200 according to the example of the present application. As shown in FIG. 9, in one example, the installation housing 250 can accommodate the photosensitive assembly 240. The movable part 271 is fixedly connected to the top surface of the photosensitive assembly 240, and the outer periphery of the fixing part 272 is fixedly connected to the inner side of the upper edge of the installation housing 250. This can not only effectively protect the photosensitive assembly 240, but also ensure the flatness of the bottom of the camera module 200. When the installation casing 250 is directly installed on the mobile terminal, the flatness of the overall structure of the camera module 200 after installation can be guaranteed.

Figure 10:
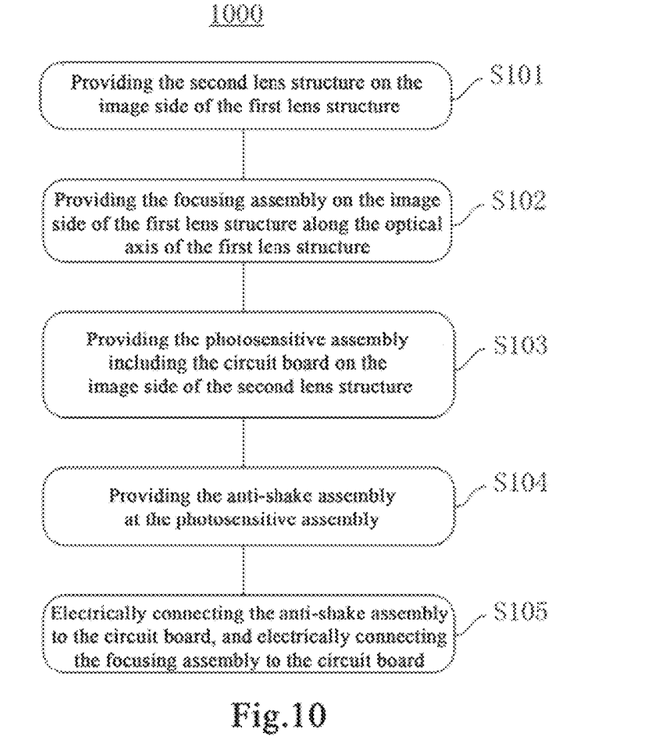
FIG. 10 is a flowchart of a method for manufacturing a camera module according to an example of the present application.

Referring to FIG. 10, the present application further provides a method for manufacturing a camera module 1000, including:

S101, providing the second lens structure on the image side of the first lens structure. Wherein, subsequent lens structures including the third lens structure is also provided on the image side of the second lens structure along the optical axis of the first lens structure.

S102, providing the focusing assembly on the image side of the first lens structure along the optical axis of the first lens structure, wherein, the focusing assembly is used to constrain the movement of the second lens structure along the optical axis direction.

Exemplarily, the focusing assembly includes the driving part and the fixing frame. Steps S101 and S102 may be completed synchronously, that is, before steps S101 and S102, the steps include: fixedly connecting the fixing frame to the first lens structure; and fixedly connecting the driving part to the second lens structure. Furthermore, when the two lens structures are provided along the optical axis, the setting of the focusing assembly is achieved synchronously.

S103, providing the photosensitive assembly including the circuit board on the image side of the second lens structure. The second lens structure is located on the photosensitive path. Wherein, each lens structure along the optical axis is located on the photosensitive path, and among these lens structures, the first lens structure is the farthest from the photosensitive assembly. The sequence of step S103 and step S101 is not limited, and can be selected according to assembly requirements.

S104, providing the anti-shake assembly at the photosensitive assembly, wherein the anti-shake assembly is used to drive the photosensitive assembly to move on the plane perpendicular to the optical axis.

Exemplarily, the anti-shake assembly includes the fixing part and to movable part. Steps S103 and S104 may be performed simultaneously. Exemplarily, before steps S103 and S103, it includes: fixedly connecting the fixing part with the first lens structure (for example, fixedly connected by a fixing frame or a housing); fixedly connecting the movable part with the photosensitive assembly, furthermore, at the time of providing the first lens structure (and other components connected with the first lens structure) on the photosensitive path of the photosensitive assembly, the steps of providing the anti-shake assembly are simultaneously realized.

S105, electrically connecting the anti-shake assembly and the circuit board and electrically connecting the focusing assembly and the circuit board. Specifically, it includes forming the laser circuit on the anti-shake assembly or the focusing assembly; and electrically connecting the anti-shake assembly or the focusing assembly and the circuit board through the laser circuit.

Figure 11:
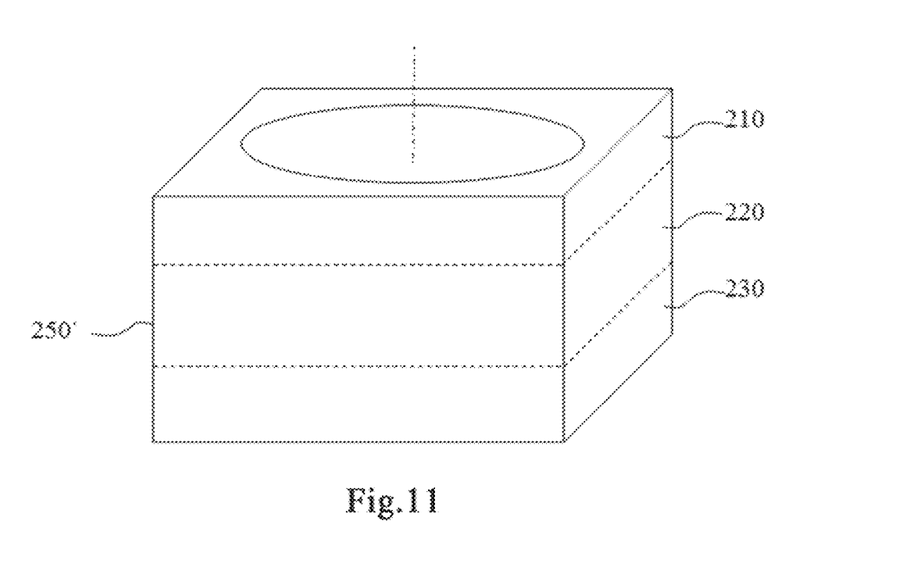
FIG. 11 is an assembly schematic diagram of a lens module according to an example of the present application.

FIG. 11 is a schematic diagram of the assembly of the camera module according to the example of the present application. As shown in FIG. 11, in one example, the third lens structure 230, the second lens structure 220 and the first lens structure 210 can be sequentially provided on the photosensitive path of the photosensitive assembly (not shown). Specifically, the photosensitive assembly can be first provided in the installation housing 250' and its position is relatively fixed, and then the third lens structure 230, the second lens structure 220 and the first lens structure 210 can be sequentially provided on the photosensitive path of the photosensitive assembly so that the optical axes of the three are in the same straight line. With this assembling method, the stability of the overall structure can be ensured, and the lens assembly is accommodated in the installation housing 250', which can ensure the compactness of each lens structure, thereby reducing the assembly height of the assembled camera module.

In another example, a split assembly method can also be used, that is, the positions of the first lens structure, the second lens structure, and the third lens structure are relatively fixed, and the lenses of the three are used for imaging together. Exemplarily, after the second lens structure is assembled with the focusing assembly, the optical axes of the first lens structure, the second lens structure assembled with the focusing assembly, and the third lens structure can be adjusted to construct imageable optical lens assemblies. After that, it is assembled with other structures of the camera module. Specifically, machine vision and active alignment technology can be used to make the optical axes of the first to third lens structures in the same straight line.

Exemplarily, the following steps also include: fixedly connecting the first lens structure and the third lens structure to the installation housing, and fixedly connecting the driving part to the second lens structure.

The camera module manufactured by the method 1000 realizes the focusing function by adjusting the relative distance between each lens structure in the optical system. In this way, the overall height of the camera module can be effectively reduced, which is beneficial to the lightening and thinning of the camera module.

Figure 12:
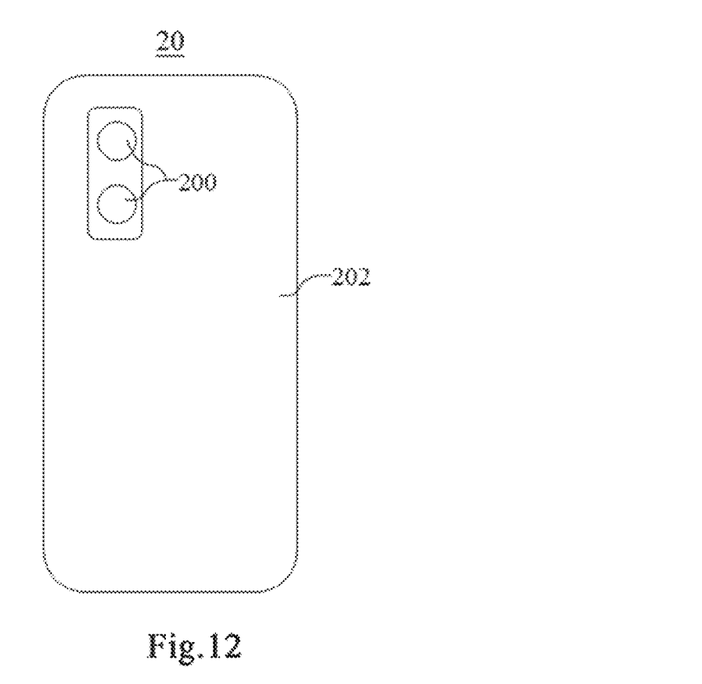
FIG. 12 is a schematic structural diagram of a mobile terminal according to an example of the present application.
Figure 13:
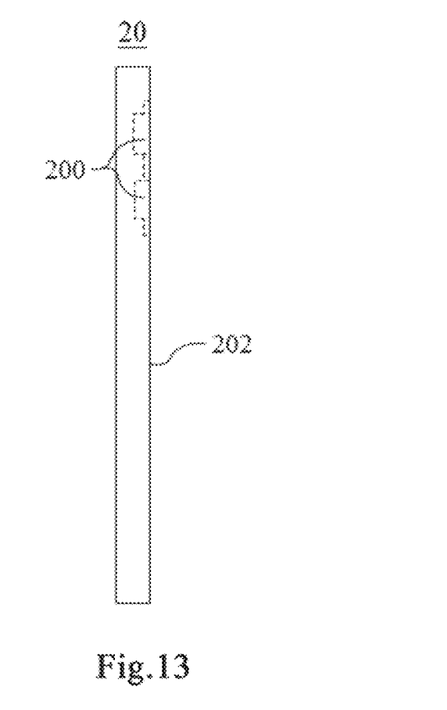
FIG. 13 is a left side view of the mobile terminal of FIG. 12.

FIG. 12 is a schematic structural diagram of a mobile terminal 20 according to an example of the present application. FIG. 13 is a left side view of the mobile terminal 20 of FIG. 12. As shown in FIG. 12 and FIG. 13, the mobile terminal 20 includes a body casing 202 and at least one camera module 200 as described in any of the above examples, for example, two. The camera module 200 may be provided inside the body casing 202, and the body casing 202 may have a installation hole matching the photosensitive path of the camera module 200.

In one example, when the first lens structure includes the first lens, the object side of the first lens may be on the same plane as the outer surface of the body casing 202. The mobile terminal 20 with the camera module 200 installed in this way can avoid the problem that the camera module 200 is too high to protrude from the body casing 202 of the mobile terminal 20, which is beneficial to improve the user's operating experience.

In one example, the camera module 200 can also be applied to the side of the mobile terminal 20 with the display panel, which not only prevents the camera module from protruding from the body casing, but also ensures the imaging quality of the front camera module.

The above description is only a preferred example of the present application and an illustration of the applied technical principles. Those skilled in the art should understand that the scope of the invention involved in this application is not limited to the technical solution formed by the specific combination of the above technical features, and at the same time, should also cover other technical solutions formed by any combination of the above technical features or their equivalent features without departing from the inventive concept, for example, a technical solution formed by replacing the above-mentioned features with the technical features with similar functions disclosed in this application (but not limited to).

The invention claimed is:

1. A camera module, which is characterized by comprising:
   a photosensitive assembly including a circuit board;
   a first lens structure provided on a photosensitive path of the photosensitive assembly;
   a second lens structure provided between the first lens structure and the photosensitive assembly, wherein, the first lens structure and the second lens structure are jointly used for imaging together, and the first lens structure is provided away from the photosensitive assembly than the second lens structure;
   a focusing assembly electrically connected to the circuit board and used to constrain the movement of the second lens structure along an optical axis direction of the first lens structure; and
   an anti-shake assembly electrically connected to the circuit board and including a movable part fixedly connected with the photosensitive assembly and a fixing part fixedly connected with the first lens structure and used for driving the movable part to move on a plane perpendicular to the optical axis of the first lens structure to drive the photosensitive assembly to move on the plane perpendicular to the optical axis of the first lens structure.

2. The camera module according to claim 1, wherein the electrical connection between the focusing assembly and the circuit board is realized through a laser circuit, and the electrical connection between the anti-shake assembly and the circuit board is realized through the laser circuit.

3. The camera module according to claim 1, wherein the focusing assembly includes:
   a driving part fixedly connected with the second lens structure; and
   a fixing frame fixedly connected with the first lens structure and constraining the driving part to move along the direction of the optical axis of the first lens structure.

4. The camera module according to claim 3, wherein the driving part is provided with at least one first magnetic structure, and is provided with at least one first ball groove parallel to the optical axis of the first lens structure; and the fixing frame is provided with at least one first coil structure and at least one second ball groove, and a position of the first coil structure corresponds to a position of the first magnetic structure, and the position of the first ball groove corresponds to a position of the second ball groove; and the focusing assembly further include a plurality of first balls located between the first ball groove and the second ball groove.

5. The camera module according to claim 1, wherein the movable part is provided with at least one second magnetic structure, and is provided with a plurality of third ball grooves perpendicular to the optical axis of the first lens structure; the fixing part is provided with at least one second coil structure and at least one fourth ball groove, and a position of the second coil structure corresponds to a position of the second magnetic structure, and a position of the fourth ball groove corresponds to a position of the third ball groove; and the anti-shake assembly further include a plurality of second balls located between the third ball groove and the fourth ball groove.

6. The camera module according to claim 1, which is characterized in that, further comprising: an installation housing, for accommodating the first lens structure and the second lens structure;
   the focusing assembly is fixedly connected to the first lens structure through the installation housing;
   the anti-shake assembly is fixedly connected to the first lens structure through the installation housing.

7. The camera module according to claim 6, wherein the installation housing accommodates the photosensitive assembly, and the movable part is fixedly connected to a top surface of the photosensitive assembly, and an outer periphery of the fixing part is fixedly connected to an inner side of an upper edge of the installation housing.

8. The camera module according to claim 6, further include:
   a third lens structure provided between the second lens structure and the photosensitive assembly, and fixedly connected to the first lens structure through the installation housing;
   wherein the focusing assembly includes an extension part located on an radial outer side of the third lens structure and extending to the anti-shake assembly along the direction of the optical axis of the first lens structure, and the focusing assembly and the circuit board of the photosensitive assembly are electrically connected to the extension part.

9. The camera module according to claim 1, wherein at least one lens of the first lens structure includes: the first lens which is farthest from the photosensitive assembly, and an object side surface of the first lens is a plane.

10. The camera module according to claim 1, wherein the circuit board has a first surface; and the photosensitive assembly includes:
   a photosensitive element provided on the first surface of the circuit board and having the photosensitive path;
   an electronic component provided on the first surface of the circuit board and provided spaced apart from the photosensitive element;
   a molding base provided on the first surface of the circuit board and having a stepped light-passing hole corresponding to the photosensitive path, wherein the stepped light-passing hole includes a first cavity away from the photosensitive element; and
   a color filter provided in the first cavity, wherein a thickness of the color filter on the optical axis of the first lens structure is less than or equal to a height of the first cavity on the optical axis of the first lens structure on axis.

11. The camera module according to claim 10, wherein the circuit board has an installation groove for accommodating the photosensitive element, and a shape of the installation groove corresponds to a shape of the photosensitive element.

12. The camera module according to claim 11, wherein a reinforcing plate is provided on a second surface of the circuit board opposite to the first surface, and the reinforcing plate is fixed to the second surface of the circuit board.

13. The camera module according to claim 11, wherein a depth of the installation groove is less than or equal to the thickness of the circuit board.

14. The camera module according to claim 10, wherein the electronic component is encapsulated by the molding base.

15. A method for manufacturing a camera module, which is characterized by comprising:
   providing a second lens structure on an image side of a first lens structure along an optical axis of the first lens structure;
   providing a focusing assembly on the image side of the first lens structure along the optical axis of the first lens structure, wherein the focusing assembly is used to constrain the movement of the second lens structure along a direction of the optical axis of the first lens structure;
   providing a photosensitive assembly including a circuit board on an image side of the second lens structure, wherein the second lens structure is located on a photosensitive path of the photosensitive assembly;
   providing an anti-shake assembly at the photosensitive assembly, wherein the anti-shake assembly includes a movable part fixedly connected with the photosensitive assembly and a fixing part fixedly connected with the first lens structure and used for driving the movable part to move on a plane perpendicular to the optical axis of the first lens structure to drive the photosensitive assembly to move on the plane perpendicular to the optical axis of the first lens structure; and
   electrically connecting the anti-shake assembly and the circuit board and electrically connecting the focusing assembly and the circuit board;
   wherein, the first lens structure is provided away from the photosensitive assembly than the second lens structure.

16. The method of claim 15, further includes:
   adjusting the first lens structure and the second lens structure by using machine vision and active alignment technology to make the optical axes of the first lens structure and the second lens structure in a same straight line.

17. A mobile terminal, which is characterized by comprising:
   the camera module according to claim 1; and
   a body casing provided with the camera module and including an installation hole matched with the photosensitive path of the camera module.

18. The mobile terminal of claim 17, wherein, among at least one lens of the first lens structure, the object side surface of the first lens which is farthest from the photosensitive element is on the same plane as an outer surface of the body casing.

* * * * *